United States Patent Office 2,912,365
Patented Nov. 10, 1959

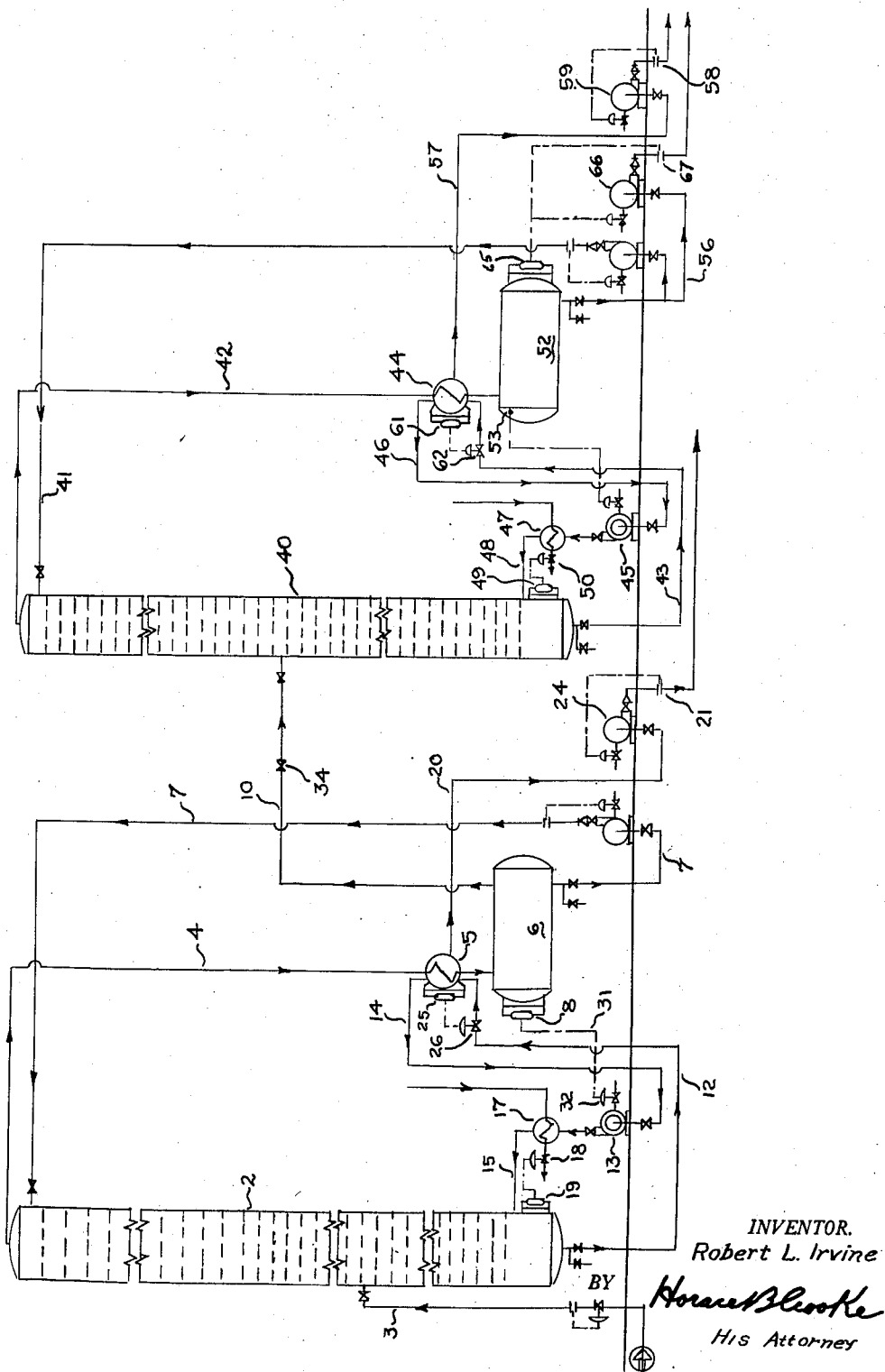

2,912,365
SYSTEM OF CONTROL FOR FRACTIONATION PROCESS

Robert L. Irvine, Pittsburgh, Pa., assignor to Gulf Oil Corporation, Pittsburgh, Pa., a corporation of Pennsylvania Application November 10, 1952, Serial No. 319,726

7 Claims. (Cl. 202—40)

This invention relates to fractional distillation and more particularly to a method and apparatus for control of operating conditions in fractional distillation.

The method and apparatus of the present invention provide self-balancing control of the operating conditions in fractional distillation. In accordance with the invention, heat balance is maintained in a fractionating column or a combination of fractionating columns and a continuous self-balancing control of product composition is afforded without manual operation of controls. The method and apparatus rely principally upon liquid level controls with resulting improved sensitivity of control as compared with temperature controls, particularly in the fractionation of multicomponent mixtures. The invention provides in particular an interacting system of control affording the mentioned advantages for separating relatively narrow boiling range mixtures by a procedure in which heat withdrawn from the overhead vapors is supplied to the bottoms liquid of a fractionating column.

The invention can best be described by reference to the attached drawing which shows diagrammatically a combination of fractionating columns equipped with a system of controls in accordance with the invention.

The method and apparatus of the invention will be described first in their application to a fractionation in which the desired overhead product is recovered in the vapor phase, that is, when the overhead condenser temperature is maintained at the dew point of the desired overhead product. Referring to the drawing, column 2 is a fractionating column of conventional design provided with liquid-vapor contacting means such as packing or fractionating trays. A mixture to be fractionated is introduced at a constant rate through line 3 into the column 2 either as a vapor or liquid. Upon entering the column the more volatile constituents of the mixture rise upwardly while the less volatile constituents flow downwardly with the liquid reflux. The more volatile constituents of the mixture are withdrawn overhead as a vapor via line 4. This overhead vapor comprises the desired overhead product and heavier constituents which are to be refluxed. Accordingly, the overhead vapor from line 4 is cooled in the overhead heat exchanger or condenser 5 to the dew point of the desired overhead product, whereupon constituents less volatile than the desired overhead product are condensed. The cooled overhead mixture passes then into the reflux drum 6 wherein disengagement of liquid and uncondensed vapor takes place. The liquid is refluxed to the top of column 2 through line 7 at a constant rate which is selected to give an overhead product of a desired composition. The desired overhead product in the vapor phase is withdrawn from the top of drum 6 by line 10 for storage or for further fractionation. When operating column 2 as a separate column or at a pressure different from subsequent columns in a combination of columns, a pressure control valve 34 in line 10 is set to maintain constant pressure in column 2.

As mentioned above, when an entirely vapor phase product is desired, the overhead condenser is maintained at the dew point of the desired overhead product. However, to accomplish this result, it is necessary because of the usual fluctuations in feed stock composition to provide for fluctuations in the cooling rate of the overhead condenser. In accordance with my invention, I provide a self-balancing system for controlling the cooling rate in the overhead condenser 5 so as to maintain the condenser at the dew point of the desired product and provide a constant reflux rate regardless of variations in the feed to column 2 and the composition of the overhead vapors from column 2.

In accordance with my invention, I provide the reflux drum 6 with a liquid level controller 8 of conventional design, which is adapted to control the rate of cooling in the overhead condenser so as to maintain a constant liquid level in the reflux drum. When the liquid level in the drum tends to exceed the pre-set level, the liquid level controller 8 operates to decrease the rate of cooling in condenser 5 so that less liquid is passed into the drum and, likewise, when the liquid level in the drum tends to fall, the liquid level controller operates to increase the rate of cooling in condenser 5 and thus causes more liquid to flow into the drum.

The drawing illustrates a highly advantageous embodiment of my invention by which the self-balancing controls referred to are obtained. In the preferred embodiment of the drawing, the cooling of heat exchanger 5 is accomplished by evaporating bottoms liquid from column 2 on the cold side of the heat transfer surface of the condenser while overhead vapors from column 2 are passed through the hot side. As the drawing shows, this can advantageously be done by delivering bottoms liquid from column 2 to the shell of heat exchanger 5 by line 12 and passing overhead vapors from line 4 through the tubes of the heat exchanger. The evaporation of a portion of the bottoms liquid in the shell of the heat exchanger results in a cooling of the remaining liquid. A high liquid level, as will be explained more fully hereinafter, is maintained in the shell to surround the tubes and afford the most complete possible indirect heat exchange between the cool liquid and the warmer vapor.

To promote the vaporization of the bottoms liquid, a reduced pressure is imposed on the shell of heat exchanger 5 by the compressor 13, which draws off bottoms product vapor as flashed. The rate of cooling in overhead condenser 5 depends upon the rate of evaporation of the liquid in the shell of the condenser which in turn depends upon the rate at which vapors are withdrawn from the shell. Therefore, to control the rate of cooling in the overhead condenser, in my preferred manner of operating I control the speed of compressor 13, this being done in the particular apparatus of the drawing by controlling the steam flow to the turbine drive of the compressor. In the embodiment of the drawing the liquid level controller 8, as mentioned above, controls the speed of compressor 5 by control impulses passed via line 31 in known manner to diaphragm valve 32 which controls the steam flow to the turbine drive of the compressor. Of course, equivalent methods of varying the rate at which vapors are withdrawn from the condenser shell can also be employed but it is an advantage of the apparatus shown in the drawing that line 14 between compressor 13 and condenser 5 contains no valves and that accordingly the compressor does the minimum necessary work in withdrawing vapors from the condenser.

As I have mentioned, the self-balancing control system of my invention provides a control of the composition of the products of the fractionation which interacts with the other elements of control of the process. In separating a mixture into two fractions as is done in column 2, the usual aim is to bring about a separation of two key components of the feed mixture, the more volatile of such components being recovered in the overhead and the less volatile in the bottoms. Accordingly, an indication of the sufficiency of the fractionation is the composition of either overhead or bottoms product in terms of concentration of the key components. Advantageously, the sufficiency of the fractionation can be determined by the concentration of the specified more volatile key component in the bottoms, an excessive concentration of such component indicating insufficient fractionation. In accordance with my invention, I provide a continuous control of the bottoms product composition by preventing the concentration of a specified more volatile component of the feed from exceeding a predetermined value. Then, because of a constant overhead reflux rate which is selected to provide an overhead product of desired composition, both products of the fractionation are produced according to specifications. The control of the bottoms product composition is accomplished in accordance with my invention by continuously analyzing the liquid bottoms product and, when the liquid is found to contain more than a predetermined maximum concentration of the specified more volatile component of the original feed stock, decreasing the rate of withdrawal of the bottoms product from the fractionation apparatus. The decrease in the rate of withdrawal of the bottoms product causes liquid to back up in the fractionating column and then as a result of the self-balancing system of control which I provide, the heat supplied to the fractionating column is increased so that the concentration of this specified more volatile component in the bottoms liquid decreases to the required level.

The drawing illustrates the preferred embodiment of my process and apparatus in which the reboiling of column 2 is accomplished by compressing and thus heating the bottoms vapors withdrawn from the shell of condenser 5 and returning the hot compressed vapors to the bottom of the fractionating column. Because of fluctuations in the feed composition to column 2, the reboiling heat required to produce a bottoms product of a desired composition varies also. In order to provide the required variation in reboiling heat in accordance with my invention, I pass the hot compressed vapors from compressor 13 through a heat exchanger 17 wherein the vapors are cooled by indirect heat exchange with a stream of coolant such as chilled water. The rate of flow of coolant through the tubes of the heat exchanger is variable so that the heat supply to column 2 can be varied as necessary. The rate of flow of coolant through heat exchanger 17 is regulated in accordance with changes in the liquid level in the bottom of column 2. I accomplish this by providing the column 2 at its lower end with a liquid level controller 19 which is adapted to operate valve 18 in the coolant line of heat exchanger 17 in response to changes in the liquid level in the bottom of column 2 so as to maintain constant liquid level in the column.

When the liquid level in the bottom of column 2 tends to rise above the predetermined constant level either because of an increase of low volatility material in the feed or because of decreased rate of withdrawal of bottoms product in response to the product analyzer control, the liquid level controller 19 operates valve 18 to decrease the rate of flow of coolant through condenser 17 so that more heat is supplied to the bottom of column 2, thus increasing vaporization within the column and checking the rise in liquid level in the bottom of the column. Likewise, if the liquid level in the bottom of column 2 tends to drop, the liquid level controller 19 operates valve 18 to increase coolant flow through heat exchanger 17 and thus decrease the heat supplied to column 2 so that less liquid is vaporized in the column.

In the modification of the process and apparatus of my invention illustrated by the drawing, the bottoms liquid from column 2 is delivered to the shell of condenser 5 by line 12. A portion of this liquid is vaporized therein to supply the cooling effect of the condenser. Unvaporized bottoms product liquid is withdrawn from the shell of condenser 5 by line 20. In accordance with my invention, I provide for continuous analysis of the composition of this liquid. This is accomplished by providing in line 20 a continuous analyzing means such as an infra red analyzer 21 of known design. Product analyzer 21 is set for a maximum concentration in the bottoms product of a specified more volatile component of the feed. Product analyzer 21 is adapted to control the speed of bottoms product pump 24, this being done in the embodiment of the drawing by controlling the steam flow to the turbine drive of the pump. When the bottoms liquid composition exceeds the predetermined maximum concentration of the specified more volatile key component, the product analyzer 21 slows down pump 24. This causes liquid to back up in the shell of condenser 5. Condenser 5 is provided with a liquid level controller 25 which is adapted to regulate the rate of flow of liquid into the condenser by operating a valve 26 in the bottoms line 12 from column 2 so as to maintain a constant liquid level in the condenser shell. Therefore, when pump 24 slows down, the liquid level in condenser shell 5 tends to rise and valve 26 is closed by liquid level controller 25. Thereupon, liquid tends to back up in the bottom of column 2. Then, in order to maintain constant liquid level in the bottom of column 2, the liquid level controller 19 operates valve 18 to increase the heat supplied to the bottom of column 2 in the manner already described. Thus, as a result of the excessive concentration of a specified more volatile constituent in the bottoms product liquid as indicated by the continuous product analyzer 21, the heat supplied to column 2 is increased so that vaporization in the column increases and the concentration of the specified constituent in the bottoms product is decreased to the required level. It should be noted from the foregoing description that in the interaction of the several controls to adjust operating conditions to meet variations in the feed composition, the liquid level on the cold side of the overhead heat exchanger is maintained constant by liquid level controller 25. This characteristic of my process is very advantageous for the reason that the heat transfer surface can be used to the fullest possible extent throughout the fractionation process.

As mentioned above, my system of control is also adaptable for fractionations in which the overhead product is recovered entirely in the liquid phase. In such a fractionation, the fractionating column overhead condenser operates at the bubble point temperature of the desired overhead product. In accordance with my invention in such a fractionation, I collect the condensed overhead product from the overhead condenser of the fractionating column in a reflux drum maintained at constant pressure. Constant pressure is maintained by providing the reflux drum with a pressure controller adapted to control the rate of cooling in the overhead condenser. When pressure in the reflux drum tends to rise above a predetermined level, thus indicating inadequate condensation in the overhead condenser, the pressure controller operates to increase the rate of cooling in the condenser.

A preferred application of the control system of my invention to a fractionation in which the overhead product is recovered entirely in the liquid phase is illustrated by column 40 of the drawing. A mixture to be fractionated is charged to column 40 by line 10. Liquid refluxed to the top of column 40 by line 41 contacts the rising vapors in the column and condenses and carries downwardly the less volatile constituents, while the more volatile constituents pass upwardly and are withdrawn overhead by line 42. The heavier constituents are withdrawn as a liquid by line 43. The overhead vapors are passed by line 42 through the tubes of condenser 44 and are there cooled to the bubble point of the desired overhead product. This, of course, results in condensation of the entire overhead vapor with the possible exception of small amounts of undissolved non-condensables, such as air which would be vented at a constant rate by a vent not shown in the drawing.

Condenser 44 is cooled by the evaporation of a portion of the bottoms liquid from column 40 in the shell of the condenser. This bottoms liquid from column 40 is delivered to the shell of condenser 44 by line 43 at a rate which is controlled to maintain a constant liquid level in the shell. The evaporation of the bottoms liquid is promoted by reducing the pressure in the condenser shell with the compressor 45. The vapors formed are withdrawn by line 46 and are compressed and thus heated by compressor 45. The heated, compressed vapors are passed to the bottom of column 40 after passage through cooler 47 by line 48 to supply reboiling heat for the column. Heat exchanger or cooler 47 operates at a variable cooling rate so that the temperature of the heated vapors in line 48 can be varied in response to variations in the heat requirement of column 40. Like column 2, the column 40 is provided with a liquid level controller 49 at its lower end which operates valve 50, in the coolant line of cooler 46. When the liquid level in the bottom of column 40 tends to rise, the liquid level controller 49 closes valve 50, so that the rate of cooling of vapors in cooler 47 is reduced and more heat is supplied to the column. The liquid level rise is then checked by increased vaporization. Likewise, when the liquid level tends to fall, the liquid level controller 49 opens valve 50 to increase the rate of cooling of the heated vapors and decrease the heat supply to the bottom of column 40.

The condensed overhead product from condenser 44 is collected in the reflux drum 52. The liquid from reflux drum 52 is partially refluxed by line 41, and the remainder is withdrawn by line 56 as product. Reflux drum 52 is provided with pressure controller 53, which is adapted to control the speed of compressor 45. The pressure controller is set for a predetermined pressure, for example, atmospheric pressure or any other pressure suitable for the particular fractionation being performed. If the pressure in the drum tends to exceed the predetermined setting, it is an indication of excessive vapor pressure of the liquid in the drum or, in other words, incomplete condensation in condenser 44. Accordingly, pressure controller 53 increases the speed of compressor 45 thus increasing the rate of evaporation in the shell of condenser 44, lowering the temperature in the condenser, and increasing the condensation of overhead vapor. Advantageously, reflux drum 52 is provided with a liquid level controller 65 which controls the rate of withdrawal of product by pump 66 to maintain constant liquid level in the drum. Flow controller 67 assists in maintaining an even rate of flow in line 56.

Only a portion of the bottoms liquid in the shell of condenser 44 is vaporized in performing the function of cooling the condenser. The unvaporized liquid is continuously withdrawn by line 57 as liquid bottoms product. As in the case of column 2, continuous bottoms product purity control is applied to column 40. This is accomplished by passing the bottoms product through a continuous product composition analyzer such as an infra red analyzer 58 in line 57. The infra red analyzer 58 is adapted to control the speed of operation of bottoms product pump 59 in response to changes in the composition of the liquid bottoms product. The analyzer is set for a maximum percentage of a specified more volatile component in the bottoms product and when this maximum is exceeded the speed of the bottoms product pump 59 is decreased. This causes liquid to back up in the shell of condenser 44. Condenser 44 is provided with a liquid level controller 61, which is adapted to control the rate of delivery of liquid to the shell of condenser 44 by operating valve 62 in bottoms product line 43 from column 40. Thus, when the liquid level tends to rise in the shell of condenser 44, valve 62 is automatically closed and liquid backs up in the bottom of column 40. This, as explained above, causes an increase in the supply of heat to the bottom of column 40 and as a result vaporization in the column is increased and the excessive volatility of the bottoms product is checked.

I have described the application of my control system for fractionating columns for two different fractionations, namely, a fractionation in which the desired overhead product is obtained entirely as a vapor; and one in which the desired overhead product is obtained entirely as a liquid. However, in fractionating complex mixtures, it is frequently desirable to fractionate in two or more stages, and the control system of my invention is also highly advantageous in such operations. The drawing shows the combination of two fractionating columns in such an operation. The columns are used in combination by utilizing the overhead vapor product line 10 of column 2 as the feed inlet line for column 40. Constant pressure is maintained in both column 2 and column 40 through maintenance of constant pressure in the reflux drum 52 by means of the pressure controller 53. From this it can be seen that the control of valve 34 to maintain constant pressure in column 2 is unnecessary when the fractionating columns are used in combination.

In the process and apparatus of my invention as described for a single fractionating column, the charge mixture is separated into two fractions. Such a separation may be desirable either with a two component mixture or with a multicomponent mixture of which it is desirable to obtain a light and heavy fraction. Also, as explained, the mixture may be separated into two fractions in a first stage and the overhead fraction of the first stage separated into two fractions in a second stage.

In the particular modification of the apparatus and process of the invention shown in the drawing with which my system of controls has its greatest advantages, the overhead product is cooled by the evaporation of bottoms liquid and heat for the fractionation is supplied by compressing the vaporized bottoms. This method of cooling and supplying reboiling heat is applicable to the fractionation of mixtures of narrow boiling range in which the temperature differential between the top and bottom of the fractionating column is not great. An example of a narrow boiling range mixture for which the process and apparatus of the drawing are particularly advantageous is a mixture of isobutene and 2-butene. Another mixture which can with great advantage be separated in the combination of two fractionating columns having the control system of my invention is a refinery $C_4$ cut which contains propane, isobutene, isobutane, 1-butene, n-butane, and 2-butene. In fractionating this mixture, the bottoms product from the first column would consist principally of the least volatile components n-butane and 2-butene and the overhead product would consist principally of propane, isobutane, 1-butene, and isobutene. In the second column, the overhead mixture from the first column would be separated into an overhead product consisting principally of propane and isobutane and a bottoms product consisting principally of isobutene and 1-butene.

In the foregoing description of my process and apparatus, I have described the use of a continuous infra red analyzer for analyzing bottoms product composition. This type of analyzer is particularly well suited for analyzing low molecular weight hydrocarbons, for example $C_7$ and lower, and therefore is preferred in fractionating a mixture such as a refinery $C_4$ fraction. However, in other fractionations, other types of continuous analyzers may be more suitable. For example, another type of continuous analyzer which operates on the principle of the absorption of specific wave lengths is the ultra violet analyzer. This analyzer is especially suitable for detecting aromatic compounds. Another suitable continuous analyzer is the paramagnetic analyzer which detects compounds having paramagnetic properties, for example, oxygenated compounds. While the continuous analyzers mentioned are preferred in my process, it is also possible, particularly in fractionations in which large changes in the composition of feed stock do no occur, to employ intermittent analyzing means. An example of such means is a mass spectrograph analyzer which can be employed to analyze product samples at regular intervals and adjust the rate of bottoms product withdrawal in response to the analyses.

From the foregoing description it can be seen that I have provided a system of controls having many important advantages. With my system of controls, a fractionating column or a combination of fractionating columns is maintained continuously in heat balance for the production of specified overhead and bottom products. In achieving this result, the principal reliance is placed on liquid level controls. These liquid level controls, particularly in the fractionation of multi-component mixtures, have superior sensitivity. Still further, by providing liquid level controls on the overhead condenser shells to maintain a constant high liquid level in such condensers, I afford maximum utilization of the tube area of the condensers throughout the fractionation. The process and apparatus have been shown to be particularly advantageous in their application to a fractionation process in which bottoms liquid is evaporated in heat exchange with the overhead vapors in the overhead condenser, and reboiling heat is supplied to the column by compressing bottoms vapors formed in the overhead condenser.

I claim:

1. In a fractionation process in which a fluid mixture is subjected to fractionation in a fractionating column and in which the overhead vapors from said column are cooled in an overhead cooling zone by indirect heat exchange with flash evaporating bottoms liquid from said column, and the reboiling heat for said column being supplied by compressing the bottoms vapors from said cooling zone and returning the compressed and thus heated vapors to the bottom of said fractionating column, the improvement which comprises withdrawing unvaporized bottoms liquid from said overhead cooling zone as bottoms product, continuously analyzing the composition of the bottoms product, controlling the rate of withdrawal of bottoms product from said cooling zone in response to changes in its composition, said rate being decreased when analysis indicates excessive concentration of a specified more volatile constituent in the bottoms product, controlling the rate of delivery of bottoms liquid from said fractionating column to said cooling zone to maintain constant liquid level in said cooling zone, passing said compressed heated bottoms vapors to said fractionating column through a second cooling zone, and controlling the rate of cooling in said second cooling zone in response to changes in the liquid level in the bottom of said fractionating column, said rate of cooling being increased with decreasing liquid level and decreased with increasing liquid level in said column.

2. In a fractionation process in which a fluid mixture is subjected to fractionation in a fractionating column and in which the overhead vapors from said column are cooled in an overhead cooling zone by indirect heat exchange with flash evaporating bottoms liquid from said column, and the reboiling heat for said column being supplied by compressing the bottoms vapors from said cooling zone and returning the compressed and thus heated vapors to the bottom of said fractionating column, the improvement which comprises withdrawing unvaporized bottoms liquid from said overhead cooling zone as bottoms product, continuously analyzing the composition of the bottoms product, controlling the rate of withdrawal of bottoms product from said cooling zone in response to changes in its composition, said rate being decreased when the analysis indicates excessive concentration of a specified more volatile constituent in the bottoms product, controlling the rate of delivery of bottoms liquid from said fractionating column to said cooling zone to maintain constant liquid level in said cooling zone, passing said compressed heated bottoms vapors to said fractionating column through a second cooling zone, controlling the rate of cooling in said second cooling zone in response to changes in the liquid level in the bottom of said fractionating column, said rate of cooling being increased with decreasing liquid level and decreased with increasing liquid level in said column, cooling said overhead vapors in said first named overhead cooling zone to the dew point of the desired overhead product, collecting the cooled overhead mixture in a reflux receptacle, separating condensate from uncondensed vapor in said reflux receptacle, withdrawing said vapor as overhead product, refluxing said condensate from said receptacle to the top of said fractionating column, and controlling the rate of evaporation of said bottoms liquid in said overhead cooling zone in response to changes in the liquid level of said reflux receptacle, said cooling rate being increased with decreasing liquid level and decreased with increasing liquid level in said reflux receptacle.

3. In a fractionation process in which a fluid mixture is subjected to fractionation in a fractionating column and in which the overhead vapors from said column are cooled in an overhead cooling zone by indirect heat exchange with flash evaporating bottoms liquid from said column, the reboiling heat for said column being supplied by compressing the bottoms vapors from said cooling zone and returning the compressed and thus heated vapors to the bottom of said fractionating column, the improvement which comprises withdrawing unvaporized bottoms liquid from said overhead cooling zone as bottoms product, continuously analyzing the composition of the bottoms product, controlling the rate of withdrawal of bottoms product from said cooling zone in response to changes in its composition, said rate being decreased when the analysis indicates excessive concentration of a specified more volatile constituent in the bottoms product, controlling the rate of delivery of bottoms liquid from said fractionating column to said cooling zone, passing said compressed heated bottoms vapors to said fractionating column through a second cooling zone, controlling the rate of cooling in said second cooling zone in response to changes in the liquid level in the bottom of said fractionating column, said rate of cooling being increased with decreasing liquid level and decreased with increasing liquid level in said column, cooling said overhead vapors in said first named overhead cooling zone to the bubble point of the desired overhead product, collecting the condensed overhead product in a reflux receptacle, refluxing a portion of said condensed overhead product to the top of said fractionating column, and controlling the rate of evaporation of said bottoms liquid in said overhead cooling zone in response to pressure changes in said reflux receptacle, said rate of evaporation being increased with increasing pressure and decreased with decreasing pressure in said receptacle.

4. A fractionation apparatus comprising a fractionating column, an overhead indirect heat exchanger, a line for delivering liquid bottoms from said fractionating column to the cold side of the heat transfer surface of said heat exchanger, an overhead vapor line for delivering vapor to the hot side of said heat exchanger, a compressor for withdrawing bottoms vapor from the cold side of said heat exchanger and returning compressed hot bottoms vapors to the lower end of said fractionating column, a second heat exchanger between said compressor and the lower end of said fractionating column for cooling said hot compressed vapors, liquid level controlling means in the lower end of said fractionating column adapted to control the rate of cooling in said second named heat exchanger in response to changes in the liquid level in the bottom of said fractionating column, a line for withdrawing bottoms product liquid from the cold side of said overhead heat exchanger, means in said line for continuously analyzing the composition of the bottoms product and adapted to control the rate of withdrawal of liquid from said heat exchanger in response to changes in its composition, and a liquid level controller on the cold side of said overhead heat exchanger adapted to maintain constant liquid level in said heat exchanger by controlling the rate of delivery of liquid to the heat exchanger from the bottom of said fractionating column.

5. A fractionation apparatus comprising a fractionating column, an overhead indirect heat exchanger, a line for delivering liquid bottoms from said fractionating column to the cold side of the heat transfer surface of said heat exchanger, an overhead vapor line for delivering vapor to the hot side of said heat exchanger, a compressor for withdrawing bottoms vapors from the cold side of said heat exchanger and returning compressed hot bottoms vapors to the lower end of said fractionating column, a second heat exchanger between said compressor and the lower end of said fractionating column for cooling said hot compressed vapors, liquid level controlling means in the lower end of said fractionating column adapted to control the rate of cooling in said second named heat exchanger to maintain constant liquid level in said column, a line for withdrawing bottoms product liquid from the cold side of said overhead heat exchanger, means for continuously analyzing the composition of the bottoms product and adapted to control the rate of withdrawal of liquid from said overhead heat exchanger in response to changes in its composition, a liquid level controller on the cold side of said overhead heat exchanger shell adapted to maintain constant liquid level therein by controlling the rate of delivery of liquid to the heat exchanger from the bottom of the fractionating column, a reflux receptacle for collecting cooled overhead mixture from said overhead heat exchanger, means for refluxing liquid from said reflux receptacle to the top of said fractionating column, and a liquid level controller on said reflux receptacle adapted to control the rate of operation of said compressor and thus the cooling rate of said overhead heat exchanger to maintain constant liquid level in said receptacle.

6. A fractionation apparatus comprising a fractionating column, an overhead indirect heat exchanger, a line for delivering liquid bottoms from said fractionating column to the cold side of the heat transfer surface of said heat exchanger, an overhead vapor line for delivering vapor to the hot side of said heat exchanger, a compressor for withdrawing bottoms vapors from the cold side of said heat exchanger and returning compressed hot bottoms vapors to the lower end of said fractionating column, a second heat exchanger between said compressor and the lower end of said fractionating column for cooling said hot compressed vapors, liquid level controlling means in the lower end of said fractionating column adapted to control the rate of cooling in said second named heat exchanger to maintain constant liquid level in said column, a line for withdrawing bottoms product liquid from the cold side of said overhead heat exchanger, means for continuously analyzing the composition of the bottoms product and adapted to control the rate of withdrawal of liquid from said heat exchanger in response to changes in its composition, a liquid level controller on said overhead heat exchanger adapted to maintain constant liquid level therein by controlling the rate of delivery of liquid to the heat exchanger from the bottom of said fractionating column, a reflux receptacle for collecting cooled overhead mixture from said overhead heat exchanger, means for refluxing liquid from said reflux receptacle to the top of said fractionating column, and a pressure controller on said reflux receptacle adapted to control the rate of operation of said compressor and thus the cooling rate of said overhead heat exchanger to maintain constant pressure in said receptacle.

7. A fractionation apparatus for separating mixtures of more than two components comprising two fractionating columns, each of said columns having an overhead indirect heat exchanger, a line for delivering liquid bottoms from the fractionating column to the cold side of the heat transfer surface of said heat exchanger, an overhead vapor line for delivering vapor to the hot side of said heat exchanger, a compressor for withdrawing bottoms vapor from the cold side of said heat exchanger and returning compressed hot bottoms vapors to the lower end of the fractionating column, a second heat exchanger between the compressor and the lower end of the fractionating column for cooling said hot compressed vapors, liquid level controlling means in the lower end of the fractionating column adapted to control the rate of cooling in the second named heat exchanger in response to changes in the liquid level in the bottom of the fractionating column, a line for withdrawing bottoms product liquid from the cold side of the overhead heat exchanger, means for continuously analyzing the composition of the bottoms product and adapted to control the rate of withdrawal of bottoms product liquid from the overhead heat exchanger in response to changes in its composition, a liquid level controller on the cold side of the overhead heat exchanger adapted to maintain constant liquid level therein by controlling the rate of delivery of liquid from the bottom of the fractionating column, a reflux receptacle for collecting cooled overhead mixture from the overhead heat exchanger, means for refluxing liquid from the reflux receptacle to the top of the fractionating column, the first of said fractionating columns having a line from its reflux receptacle for passing overhead product vapor to the second of said fractionating columns, the reflux receptacle for said first fractionating column having a liquid level controller adapted to control the rate of operation of the compressor for the first column and thus the cooling rate of the overhead heat exchanger for the first column to maintain constant liquid level in the receptacle, and the reflux receptacle for said second column having a pressure controller adapted to control the rate of operation of the compressor for the second column and thus the cooling rate of the overhead heat exchanger for said second column to maintain constant pressure in said receptacle and in both fractionating columns.

References Cited in the file of this patent

UNITED STATES PATENTS

| | | |
|---|---|---|
| 1,730,892 | Leslie | Oct. 8, 1929 |
| 2,251,771 | Wynn et al. | Aug. 5, 1941 |
| 2,276,089 | Ragatz | Mar. 10, 1942 |
| 2,357,113 | Houghland et al. | Aug. 29, 1944 |
| 2,386,830 | Wright | Oct. 16, 1945 |
| 2,386,831 | Wright | Oct. 16, 1945 |
| 2,388,931 | Nelson | Nov. 13, 1945 |
| 2,441,361 | Kirgan | May 11, 1948 |
| 2,456,398 | Gerhold | Dec. 14, 1948 |
| 2,459,404 | Anderson | Jan. 18, 1949 |
| 2,489,949 | Blair | Nov. 29, 1949 |
| 2,509,136 | Cornell | May 23, 1950 |
| 2,529,030 | Latchum | Nov. 7, 1950 |
| 2,534,274 | Kniel | Dec. 19, 1950 |
| 2,588,303 | Stanley | Mar. 4, 1952 |
| 2,619,814 | Kniel | Dec. 2, 1952 |
| 2,709,678 | Berger | May 31, 1955 |

OTHER REFERENCES

Rern, Donald, Q.: "Process Heat Transfer," 1950, McGraw-Hill Book Co. Inc., N.Y., page 784, Figure 21.21 relied on.